Dec. 23, 1941.　　F. W. SULLINGER ET AL　　2,266,918
DIRECTION FINDER
Original Filed Feb. 4, 1937
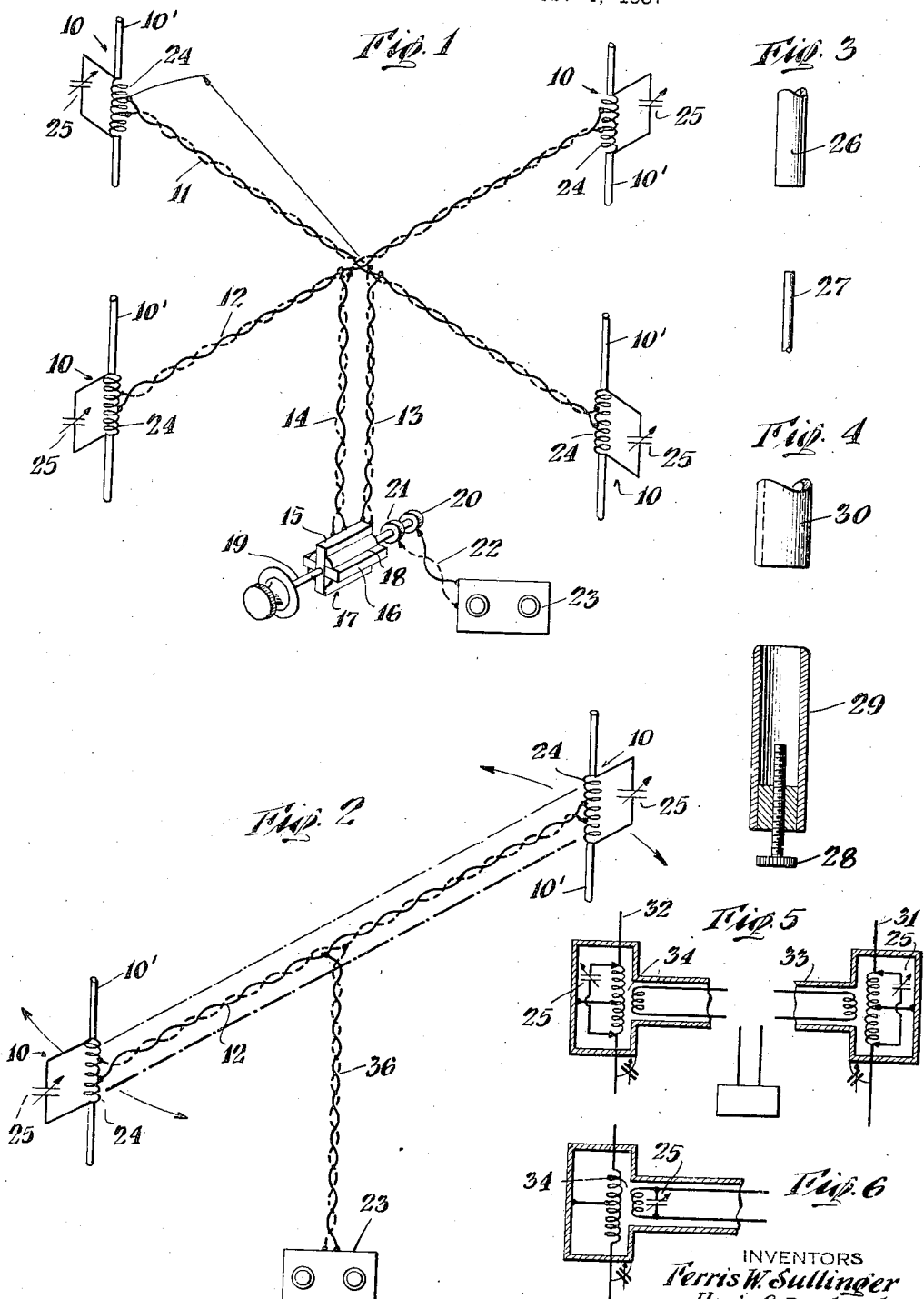
INVENTORS
Ferris W. Sullinger
BY Hugo C. Leuteritz
ATTORNEYS Patented Dec. 23, 1941

2,266,918

UNITED STATES PATENT OFFICE 2,266,918

DIRECTION FINDER

Ferris W. Sullinger, Coral Gables, Fla., and Hugo C. Leuteritz, Rockville Centre, N. Y., assignors to Pan American Airways Corporation, Jersey City, N. J., a corporation of Delaware Original application February 4, 1937, Serial No. 124,108, now Patent No. 2,174,014, dated September 26, 1939. Divided and this application April 12, 1939, Serial No. 267,390

8 Claims. (Cl. 250—11)

This invention relates to radio direction finders and is a division of our application Serial No. 124,108, filed February 4, 1937, now Patent No. 2,174,014.

An object of our invention is to provide a radio direction finder that is electrically symmetrical and accurately indicates at all times the exact direction of an arrival of received waves.

The invention is embodied in spaced dipole direction finders in which the opposite dipoles are maintained in electrical symmetry by means of capacity and/or inductance balancing means. More particularly, one form of direction finder embodying the invention is provided with dipoles of unequal size whereby the normal difference in capacity caused by closer proximity of the lower dipole to the radio frequency ground is overcome and the capacities of the upper and lower dipoles are rendered substantially equal. This form of the invention can be placed in a condition of substantial balance prior to the adjustment of the capacity or inductance balancing means to render the entire system electrically symmetrical.

Another form of the invention is embodied in an unsymmetrical spaced dipole direction finder in which the upper and lower dipoles are of unequal size and shielding means are provided for preventing largely the pick up of the horizontal component of a received wave, thus overcoming the "night effect" which prevents accurate determination of a radio frequency wave source.

Direction finders of the types embodying the present invention are capable of accurately determining the direction of a source of radio frequency signals because the direction finders are electrically symmetrical, that is, opposite dipole units deliver equal electromotive forces to the electrical center of the system and will maintain this condition regardless of weather or other variable factors.

For a better understanding of the present invention reference may be had to the accompanying drawing in which:

Fig. 1 is an illustrative embodiment of a radio direction finder of the elevated spaced fixed type;

Fig. 2 is an illustrative embodiment of a direction finder of the elevated rotary type;

Fig. 3 ilustrates a dipole having an upper arm of greater diameter than its lower arm;

Fig. 4 illustrates a dipole having a screw in its lower arm for changing the effective length of that arm;

Fig. 5 is a modified form of direction finder wherein the upper and lower arms of the dipoles are of different length and the horizontal transmission lines and a portion of the dipoles are enclosed in a metallic shield; and Fig. 6 illustrates a modification of the form of direction finder shown in Fig. 5.

Referring now to the drawing and in the first instance to Fig. 1, there is disclosed a direction finder identical with one of the forms of direction finders disclosed in application Serial No. 124,108, of which this is a division. It will be noted that the direction finder comprises four vertical, elevated dipoles 10 spaced 90° apart, each having a lower and upper arm 10′. Opposite dipoles are electrically connected in phase opposition by means of transposed transmission lines 11 and 12, the latter being spaced 90° apart. Lead lines 13 and 14 connect the center points of transmission lines 11 and 12, respectively, with the stator coils 15 and 16 of the radio goniometer 17.

The goniometer is of conventional type and has a search coil which is rotatable in the stator coils 15 and 16 by means of a shaft 19. The search coil 18 is connected through slip rings 20 and 21 and lead lines 22 to a conventional type receiver 23. Each of the dipoles 10 shown in Fig. 1 is provided with a matching transformer 24 which is connected in series between the upper and lower halves of each dipole, and a variable condenser connected in shunt with each of the matching transformers.

In order to produce sharp minima and thereby give accurate bearings upon a transmitting station, the electromotive force delivered by opposite dipole antennae assemblies to the mid-point of their transmission lines must be the same. This electromotive force is affected by a number of conditions, as for example, the over-all length of the antennae, the total inductance of the coil or other means used for connecting the upper and lower arms of the dipoles, the inductance of that portion of the connecting coil across which the transmission line is tapped, the attenuation of the transmission line and the capacity across the connecting coil. In practice the last mentioned condition has been found to vary most and thus produce the greatest variation in the electromotive force, the variations in the other conditions being minute.

Wide variations in electromotive force are likely to occur particularly when the opposite dipoles are spaced a considerable distance apart, because under this condition, the distance of the true radio frequency ground below the surface of the earth may vary considerably at the dipole locations. With different spacings of the dipole assemblies from true radio frequency ground, the capacity of the dipole assemblies across the matching transformers may be considerably different. In order to avoid the difficulties resulting from unequal capacities to ground of the upper and lower halves of each dipole the dipole arms may be formed of unequal size, as illustrated in Fig. 3. For example, the upper dipole arm 26 may be made of greater diameter than the lower dipole arm 27, thus balancing out the normally larger capacity of the lower rod caused by its closer approximity to ground. This type of dipole may be used with any suitable form of connection between the lower and upper rods 27 and 26. For example, the connection may consist of the matching transformer 24 or variable condenser 25 or a combination of these two such as is illustrated in Fig. 1.

The capacities of the upper and lower arms of the dipoles may likewise be balanced by the construction disclosed in Fig. 4. This modification consists of providing a screw 28 in the lower arm 29 of the dipole. By turning this screw in clockwise and counter-clockwise directions the effective electrical length of the arm 29 may be varied so as to effect a balance of capacity between arm 29 and the ground with the capacity between the upper arm 30 and the ground. It can also be used to balance the capacities of opposite dipoles. Similarly to the arrangement shown in Fig. 3, the connections between the upper arm 30 and the lower arm 29 may be of any suitable type such as, for example, that shown in Fig. 1.

Dipole arms of unequal size may also be used in a spaced rotary type of direction finder of the type illustrated in Fig. 2. In this form of direction finder, two dipole assemblies 10 of a type similar to those of Fig. 1 are connected by the transmission line 12 and the whole system mounted for rotation about the center line midway between and parallel to the dipole assemblies. The lines 12 are connected at either side of the center taps on the matching transformer 24. Now, if the dipoles are mounted at such a height that there is an appreciable difference in capacity to ground of the upper and lower halves with equally sized dipoles as illustrated, this difference of capacity can be compensated by using dipoles of unequal effective size, such as those illustrated in Figs. 3 and 4. Lead line 36 connects the center point of the transmission line 12 to the receiver 23. The balancing condensers 25 are connected in shunt with the matching transformers 24 the same as in Fig. 1.

In balancing the capacity of either the space fixed system shown in Fig. 1 or the rotating system in Fig. 2, after permanent installation, the variable condensers may be properly adjusted through the use of a light non-conducting rod. Likewise, when dipoles of unequal size such as shown in Figs. 3 and 4 are used, the installation may be made in such a way that each of the arms of the dipoles has equal or substantially equal capacity. Thus with the modification shown in Fig. 4, the screw 28 may be turned either clockwise or counter-clockwise to balance the capacities between the upper and lower arms and ground.

A modified form of direction finder is disclosed in Fig. 5 and includes a non-symmetrical antennae arrangement in which the vertical dipoles 31 and 32 have upper and lower arms of different lengths. A variable condenser is provided between each lower dipole arm and a metallic shield 33 to balance out the electrical coupling between these members. This shield serves the function of avoiding, at least to some extent, the pick-up of the horizontal component of the received wave and thus largely overcomes the well known "night effect" which adversely affects the accuracy of a direction finder. Matching transformers 34 serve to match the impedance in the system and variable condensers 25 balance the capacities of the opposite dipoles.

In Fig. 6 there is shown a modification of the assembly shown in Fig. 5 in which the variable condenser 25 is connected across the secondary of the matching transformer 34 instead of the primary, as in Fig. 5.

In practice, it has been found that the forms of the invention described above are highly efficient and that under all conditions of use sharp minima in the signals received from any and all directions are produced. The accurate impedance matching produced by the matching transformers has made it possible to use our directions finders with marked success over long distances and under varying weather conditions.

It is to be understood that various modifications can be made in the construction and method of operation disclosed hereinabove without departing from the scope of our invention as defined in the following claims.

We claim:

1. A radio direction finder comprising a pair of vertical dipoles each having an upper and a lower portion of unequal size, a matching transformer and a variable condenser electrically connecting said upper and lower portions of each dipole for equalizing the capacities of said dipoles, and transposed transmission lines extending between said dipoles and inductively connected thereto.

2. A radio direction finder comprising at least two unsymmetrical vertical dipoles each having an upper and a lower portion of unequal length, a matching transformer and variable condenser connected between said upper and lower portions for equalizing the capacities of said dipoles, transmission lines extending between said dipoles and inductively connected thereto, and a metallic shield enclosing said transmission lines and their connections with said dipoles.

3. The radio direction finder set forth in claim 1 in which the upper portion is of greater diameter than the lower portion to compensate for the normally greater capacity between the lower portion and ground, due to their proximity, than the capacity between the upper portion and ground.

4. In a radio direction finder the combination of a pair of dipoles having arms of unequal size, means supporting said dipoles in spaced apart relationship, matching transformers electrically connected between the arms of each dipole, capacity balancing devices electrically connected between the arms of each dipole for equalizing the capacities of said dipoles, and transmission lines extending between and connected to the matching transformers associated with each dipole.

5. In a radio direction finder the combination of a pair of dipoles having arms of unequal size, means supporting said dipoles in spaced apart relationship for rotation about the center of said means, matching transformers electrically connected between the arms of each dipole, capacity adjusting devices electrically connected the arms of each dipole for equalizing the capacities of said dipoles, and transmission lines extending between and connected to the matching transformers associated with each dipole.

6. The radio direction finder set forth in claim 4 comprising a metallic shield enclosing said transmission lines and their connections with said dipoles.

7. In a radio direction finder, the combination of a pair of elevated spaced dipoles each having an upper and a lower arm, an adjustable member on each lower arm for changing the effective length of said lower arms, a matching transformer and a condenser connected between the upper and lower arms of each dipole for equalizing the capacities of said dipoles, and transposed transmission lines extending between said dipoles and connected to said transformers.

8. A radio direction finder comprising a pair of spaced dipole units each having a lower and an upper portion, one of said portions being adjustable as to length for equalizing its capacity to ground with the capacity between the other portion and ground and for equalizing the capacity of one dipole unit with respect to the other spaced dipole unit.

FERRIS W. SULLINGER.
HUGO C. LEUTERITZ.